(12) United States Patent
Holmes et al.

(10) Patent No.: US 11,645,265 B2
(45) Date of Patent: May 9, 2023

(54) MODEL FOR HANDLING OBJECT-LEVEL DATABASE TRANSACTIONS IN SCALABLE COMPUTING APPLICATIONS

(71) Applicant: Oracle International Corporation, Redwood Shores, CA (US)

(72) Inventors: Madeleine Dawn Holmes, Darlington (GB); Surendra Nath V. N. R. K Nukala, Fremont, CA (US); Anveshan Reddy Kunduru, Hyderabad (IN); Chaitanyasri Molakalapalli, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 542 days.

(21) Appl. No.: 16/673,510

(22) Filed: Nov. 4, 2019

(65) Prior Publication Data
US 2021/0133178 A1 May 6, 2021

(51) Int. Cl.
*G06F 16/23* (2019.01)
(52) U.S. Cl.
CPC .............................. *G06F 16/2365* (2019.01)
(58) Field of Classification Search
CPC .................................................. G06F 16/2365
USPC ........................................................ 707/703
See application file for complete search history.

(56) References Cited

U.S. PATENT DOCUMENTS

| | | | |
|---|---|---|---|
| 7,716,247 B2 | 5/2010 | Brjazovski et al. | |
| 9,239,858 B1 | 1/2016 | Willeford | |
| 9,842,031 B1 * | 12/2017 | Kharatishvili | G06F 16/27 |
| 10,095,763 B1 | 10/2018 | Colgrove et al. | |
| 11,068,462 B1 * | 7/2021 | Grzech | G06F 16/1873 |
| 2002/0138483 A1 | 9/2002 | Bretl et al. | |
| 2004/0230621 A1 | 11/2004 | Croisettier et al. | |
| 2005/0108295 A1 | 5/2005 | Karimisetty et al. | |
| 2005/0198055 A1 * | 9/2005 | Mihaila | G06F 16/8358 |
| 2006/0248128 A1 | 11/2006 | Acharya et al. | |
| 2006/0288173 A1 * | 12/2006 | Shen | G06F 9/30072 711/141 |
| 2007/0118572 A1 | 5/2007 | Fischer et al. | |
| 2007/0180075 A1 | 8/2007 | Chasman et al. | |
| 2007/0219976 A1 | 9/2007 | Muralidhar et al. | |
| 2007/0283011 A1 | 12/2007 | Rakowski et al. | |
| 2008/0005332 A1 * | 1/2008 | Pande | G06F 9/4843 709/226 |
| 2009/0300017 A1 * | 12/2009 | Tokusho | G06F 16/2343 |
| 2009/0327817 A1 | 12/2009 | Iyengar et al. | |

(Continued)

*Primary Examiner* — James Trujillo
*Assistant Examiner* — Fariborz Khoshnoodi
(74) *Attorney, Agent, or Firm* — Invoke

(57) ABSTRACT

Techniques are described handling database transaction in a manner that is efficient and flexible. In some embodiments, a system receives, through a page of a user interface, a first request to change at least a first data object. The system generates, based on the first request, a first atomic transaction to modify the first data object in a database. Before the first atomic database transaction has committed to the database, the system receives, through the page of the user interface, a second request to change at least a second data object. The system generates, based on the second request, a second atomic transaction to modify the second object in the database. The system may execute the second atomic transaction independently of the first atomic transaction.

20 Claims, 7 Drawing Sheets

(56) References Cited

U.S. PATENT DOCUMENTS

| | | | |
|---|---|---|---|
| 2010/0174694 A1* | 7/2010 | Staebler | G06F 16/2358 |
| | | | 707/703 |
| 2011/0016099 A1* | 1/2011 | Peer | G06F 16/282 |
| | | | 707/E17.055 |
| 2014/0201331 A1* | 7/2014 | Kershaw | G06Q 10/06 |
| | | | 709/219 |
| 2015/0012399 A1 | 1/2015 | Ceribelli et al. | |
| 2015/0032710 A1* | 1/2015 | Latrous | G06F 16/2365 |
| | | | 707/703 |
| 2017/0235710 A1 | 8/2017 | Simons et al. | |
| 2018/0089299 A1* | 3/2018 | Collins | G06F 16/282 |
| 2018/0260258 A1 | 9/2018 | Wester | |
| 2019/0018858 A1 | 1/2019 | Krishnamachari-Sampath et al. | |
| 2019/0163632 A1* | 5/2019 | Walker | G06F 12/0831 |
| 2019/0205244 A1* | 7/2019 | Smith | G06F 12/12 |
| 2019/0340166 A1 | 11/2019 | Raman et al. | |
| 2019/0347167 A1* | 11/2019 | Wang | G06F 11/1451 |
| 2020/0151279 A1 | 5/2020 | Haberstroh | |
| 2020/0272619 A1* | 8/2020 | Alferov | H04L 9/0643 |

* cited by examiner

Personal Details
Veda Moss

First Name
Veda

*When does this name change start?
m/d/yy
Enter 1/1/20 if you ar correcting a mistake in your name

*Last Name
Moss

Comments

Attachments

⊕ Drag files here or click to add attachment ˅

Submit   Cancel

First Name
Veda

Suffix
MR.

Middle Name
VMOSS

Demographic Info
⚠ Pending Approval

Country
United States

Ethnicity
Two or more races

Marital Status
Single

Gender
Female 600
602
604
606

FIG. 6

MODEL FOR HANDLING OBJECT-LEVEL DATABASE TRANSACTIONS IN SCALABLE COMPUTING APPLICATIONS

INCORPORATION BY REFERENCE

This application is related to U.S. application Ser. No. 16/663,924, titled "PARTIAL PAGE APPROVAL MODEL", filed Oct. 25, 2019, which is hereby incorporated by reference.

RELATED APPLICATIONS; INCORPORATION BY REFERENCE

This application is related to U.S. Provisional Patent Application 62/857,760, filed Jun. 5, 2019, titled "Application Driven Data Change Conflict Handling System", which is hereby incorporated by reference.

TECHNICAL FIELD

The present disclosure relates, generally, to models for managing database transactions. In particular, the present disclosure relates to transactions interfaces that provides flexibility in the atomicity in object-level transactions.

BACKGROUND

Many web applications and other types of software systems include user interfaces designed to facilitate data entry and manipulation. For instance, a web application may present through a client, such as a web browser or mobile application, a set of graphical user interface (GUI) objects that allow a user to view, add, edit, delete, and/or otherwise modify data that is stored in an underlying database. A user may input data into text boxes and/or other GUI fields and submit the changes to initiate a transaction with the underlying database.

Generally, each data entry submission is handled as an atomic transaction. Atomicity is a feature where all data entry operations in a transaction are performed or none of them are. For example, if a submitted transaction updates ten rows, and one or more rows fails to update in the transaction, then the system rolls back any changes made to the other rows. Thus, atomicity prevents partial updates from occurring.

Atomicity helps ensure consistency in a database and protect against different transactions from interfering with one another. For example, a transaction for moving a database record from one table to another may include an operation for deleting the record from the first table and inserting the record into the second table. If the delete operation is performed but the insert operation fails, then the record may disappear if a rollback is not executed. An atomic database transaction prevents this scenario from occurring. However, strict adherence to atomicity may limit application flexibility and lead to inefficiencies. For instance, the application may be required to wait for all changes to be approved even though one or more of the changes may not be dependent on other submitted changes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates an example user interface page for submitting changes to a database that allows for further submissions when a previous submission is pending in accordance with some embodiments.

DETAILED DESCRIPTION

Figure 1:
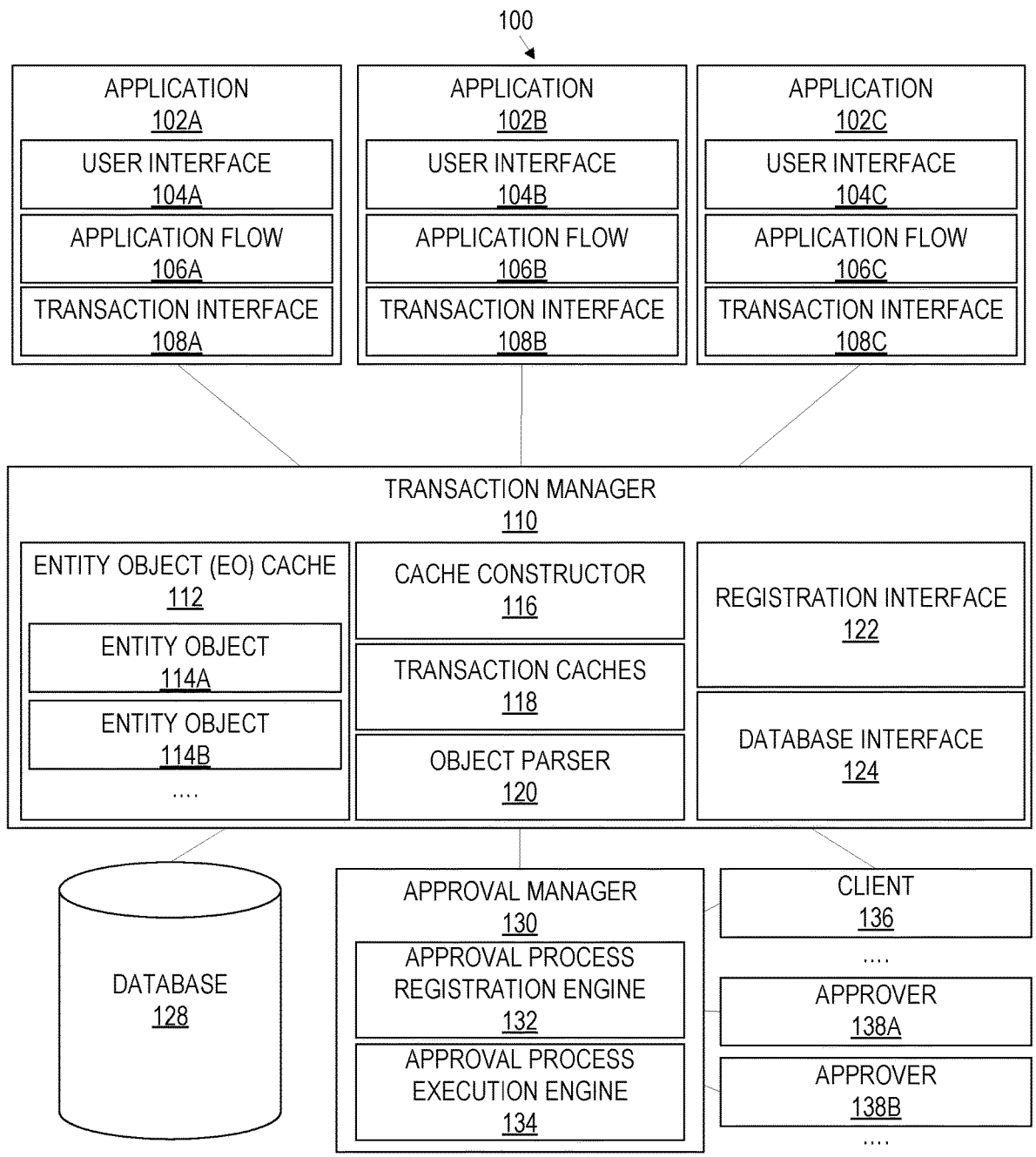
FIG. 1 illustrates an example system for processing object-level database transactions in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 PAGE MODEL FOR IMPLEMENTING OBJECT-LEVEL TRANSACTIONS
   3.1 PAGE SUBMISSIONS AND PROCESS OVERVIEW
   3.2 OBJECT RELATIONSHIP RULES AND DEFINITIONS
   3.3 PARSING AND FILTERING HIERARCHICAL DATA FOR CACHING
   3.4 OBJECT-LEVEL APPROVAL TRANSACTION PROCESSING
4.0 DATA CONCURRENCY AND CONSISTENCY CONTROLS
   4.1 PAGE RENDERING AND LOCK MANAGEMENT
   4.2 EXAMPLE USER INTERFACE PAGE PROCESSING
5.0 COMPUTER NETWORKS AND CLOUD NETWORKS
6.0 MICROSERVICE APPLICATIONS
7.0 HARDWARE OVERVIEW
8.0 MISCELLANEOUS; EXTENSIONS

1.0 General Overview

Systems and methods described herein provide a page transaction model for managing changes submitted through user interface pages. In some embodiments, the page transaction model includes a transaction framework for constructing atomic database transactions based on detected or learned relationships between data objects. The transaction framework may construct multiple atomic transactions for changes submitted through the same user interface page. Individual database transactions may be managed asynchronously and independently. If a change in one database transaction fails, then changes in other transactions that were generated as part of the same page submission do not need to be rolled back. Thus, the completion of one transaction is not held up waiting for another transaction that was part of the same page submission, which allows for more streamlined interfaces and efficient database commits.

In some embodiments, the transaction framework allows for customizable rules and relationship definitions that control how data objects are grouped into transactions for a given user interface page. The customizable rules and relationship definitions allow for flexibility in transaction atomicity. As an example, pages from different application flows may target changes to the same set of database records but may be handled differently based on application-specific rules. For one page, a transaction manager may group all changes to the database records into a single database transaction and, for a different page, the transaction manager may separate changes to the same database records into different database transactions. In the former case, if the transaction fails, any changes that were made during execution of the transaction may be rolled back. In the latter case, changes may be committed even when changes to a different transaction fail. Thus, the framework allows application-specific context to be factored into what changes are interrelated on a given page and the atomicity of a page submission.

In some embodiments, the transaction framework registers approval process definitions for different objects or groups of objects on a user interface page. An approval process definition may define a flow comprising steps and conditions that must be satisfied for a transaction to be approved. When a change is submitted through a page, an approval manager may load one or more process definitions that has been registered for each relevant object or group of objects. The approval manager may execute steps and evaluate the conditions defined by the process definition to determine whether the changes are approved. The approval manager may route the transaction to one or more approver nodes defined by the process, which may vary between different objects and/or groups of objects associated with the user interface page. An approver node may correspond to an authorized approver, which may be a user or an automated process. If approved, then the transaction framework may commit the changes to the database. If denied, then the transaction framework may prevent the changes from being committed to protect data security and integrity.

In some embodiments, the transaction framework monitors the states of transactions initiated for a given page submission. Example states may include, but are not limited to, committed, pending, and failed/denied. A committed transaction is one in which the changes have been persisted or otherwise saved to the database. Committed changes are visible to applications and other users of the database. A transaction in a pending state is one that has not committed or failed. For example, the transaction may be pending approval or a transaction commit may not have completed yet. In some cases, the transaction framework may issue a lock to prevent other database clients from modifying database objects that have changes pending. A transaction in a failed state is one for which the changes could not be committed to the database. A transaction may fail for a variety of reasons. Examples include, but are not limited to, the transaction being denied during the approval process, occurrence of an error such as a hardware failure during the transaction commit or approval process, and conflicting changes made by another database client such as those made to a database object by another application between loading of the user interface page and submission of the changes to the database object.

In some embodiments, a user interface page may be refreshed to reflect the current state of transactions initiated for a given submission. For example, the user interface page may present a visual indication of which changes were committed, which changes are pending approval, and/or which changes were denied. A user may then edit and/or resubmit changes through the user interface page. Additionally or alternatively, the user may be presented with another page in an application flow, which may account for the current state of transactions based on a previous page submission.

In some embodiments, the transaction framework is configured to manage locks on entity objects. If a transaction on an entity object is pending, then the transaction framework may grant a lock to prevent further changes from being submitted. A user interface page may be rendered based on which entity objects are locked. For example, user interface objects may be disabled and/or omitted to prevent submissions that may affect locked entity objects. The locks may be processed at the individual object level or for groups of objects rather than locking an entire page. Thus, a user may submit changes via a user interface page when a portion of the page is locked but may be restricted to interfacing with certain page regions and user interface objects.

One or more embodiments described in this Specification and/or recited in the claims may not be included in this General Overview section.

2.0 System Architecture

FIG. 1 illustrates system 100 for processing object-level database transactions in accordance with some embodiments. As illustrated in FIG. 1, system 100 includes applications 102a-c, transaction manager 110, database 128, and approval manager 130. System 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Applications 102a-c are a plurality of computing applications with access to shared data within database 128. In some embodiments, each application provides respective user interfaces 102a-c, application flows 106a-c, and transaction interface 108a-c. A user interface may comprise hardware and/or software configured to facilitate communications between a user and the application. An application may be configured to render user interface elements and receives input via user interface elements. Example interfaces include, but are not limited to, a graphical user interface (GUI), a web interface, a command line interface (CLI), a haptic interface, and a voice command interface. Example user interface elements include, but are not limited to, checkboxes, radio buttons, dropdown lists, list boxes, buttons, toggles, text fields, date and time selectors, command lines, sliders, pages, and forms.

In some embodiments, user interfaces 104a-c include pages through which changes may be submitted to database 128. A user interface page may include any interface through which a set of user interface objects may be concurrently displayed to an end user through which the user may view and/or modify data in database 128. A page may include one or more of the user interface elements previously described, such as text boxes and/or other GUI fields, to submit changes and initiate a transaction with database 128. The entire page may be concurrently displayed to a user or may be scrollable, depending on the particular application and/or screen resolution of the device used to present the page.

A user interface page may be specified in one or more languages that may be interpretable or executable by an application. For example, a webpage may specify the behavior of user interface elements in a dynamic programming language, such as JavaScript. The content of user interface elements may be specified in a markup language, such as hypertext markup language (HTML) or XML User Interface Language (XUL). The layout of user interface elements is specified in a style sheet language, such as Cascading Style Sheets (CSS). A browser application may then render the webpage based on the code. The browser application may allow a user to scroll, enter text, and/or otherwise interact with the webpage. A user interface page may also be specified in one or more other programming languages, such as Java, C, or C++. Additionally or alternatively, other mobile and/or desktop applications may include logic for rendering the page based on what is specified in the programming languages.

In some embodiments, application flows 106a-c define sequences of pages. For example, a project management application flow may allow a use to view existing projects on a first page. The user may then select to create a new project or view an existing project to navigate to a second page. For a new project, a second page in the flow may allow a user to define parameters of the project, such as the project name, timeline, etc. A third page of the flow may allow a user to add resources to the project. As another example, an online shopping cart application may allow a user to view contents temporarily stored in the cart. Upon selecting "Checkout", the user may be directed to a second page where the user may enter shipping and billing information. A third page may allow a user to review/edit the submitted order. The number of pages and the types of pages may vary from one application flow to the next.

Transaction interfaces 108a-c provide an interface and communication protocol between applications 102a-c and transaction manager 110. In some embodiments transaction interfaces 108a-c comprise an application programming interface (API) through which one or more functions of transaction manager 110, described further herein, may be invoked. For example, an application may register rules and/or approval process definitions. Additionally or alternatively, an application may submit changes to database 128.

In some embodiments, applications 102a-c are different applications in an integrated suite of applications. Each application may comprise software and/or hardware for performing a set of one or more application-specific functions. For example, an enterprise management (EM) system may include, but is not limited to, a set of interrelated applications for testing, deploying, operating, monitoring, diagnosing, and/or resolving problems among deployed hardware and/or software resources. As another example, an enterprise resource planning (ERP) system may, include, but is not limited to, a set of interrelated applications for managing employees, coordinating sales, providing customer services (CRM), automating accounting operations, and/or supporting business intelligence (BI) operations. Additionally or alternatively, applications 102a-c may include other applications that share access to data stored in data repository 104.

One or more of applications 102a-c may be a cloud service, such as a software-as-a-service (SaaS) or a web service. Users may access cloud services using a client, such as a web browser, mobile application, or other software application communicatively coupled to a network. The client may interact with cloud services using one or more communication protocols, such as HTTP and/or other communication protocols of the Internet Protocol (IP) suite. Additionally or alternatively, one or more of applications 102a-n may be locally accessible to a user, such as a desktop or other standalone application.

In some embodiments, transaction manager 110 comprises a framework for managing transactions with database 128. Transaction manager 110 may receive changes submitted through user interfaces 104a-c and group changes based on associated rules and conditions. Transaction manager 110 may include entity object (EO) cache 112, cache constructor 116, transaction caches 118, object parser 120, rule registration interface 122, rule registration engine 124, and database interface 124.

Entity object (EO) cache 112 store entity objects, such as entity objects 114a-b, that are accessed by a user interface page. In some embodiments, EO cache 112 tracks and stores pending change to the entity objects. An entity object in this context may refer to a data object that is mapped to one or more database objects, such as one or more rows/records of a database table. For example, an entity object instance may store the primary key of a record that is being added, deleted, updated, or otherwise modified from a database table, where a primary key is a value that uniquely identifies a database record. A primary key may be generated as a function of values from a column or combination of columns that do not have the same unique value across multiple records in the same database table.

In some embodiments, entity objects may follow a data hierarchy. For example, an entity object may represent a person in an organization. The entity object may be mapped to records distributed across different database tables that are associated with the person and linked via a primary key that uniquely identifies the entity object within database 128. For instance, the primary key may link the person object to a residence address in one table, phone number in another table, assigned projects in a third table, and/or other database records. In this example, the person may represent one entity object that is a parent node to other entity objects including the address record, phone record, and project records. A data hierarchy may run multiple levels deep. For instance, the person object may have a parent node corresponding to an organization or some other entity with which the person is associated.

In some embodiments, EO cache 112 is populated in real-time as users are interacting via user interfaces 104a-c. For example, EO cache 112 may be loaded with entity object instances corresponding to records storing data that is currently being accessed through a page of a user interface. If a user is viewing resources assigned to a particular project, for instance, then transaction manager 110 may load records corresponding to each resource into EO cache 112. As a user adds, removes, and/or otherwise modifies resources, each entity object instance in EO cache 112 may be updated to track the pending changes.

Cache constructor 116 may be configured to generate and manage caches for use during transaction processing. In some embodiments, cache constructor 116 generates a cache by allocating space from system memory. The size of a cache may vary from implementation to implementation. For example, a default amount of memory may be allocated for the cache or the allocation size may be computed based on the number of changes in a transaction.

In some embodiments, cache constructor 116 is configured to generate transaction caches 118. Transaction caches 118 may include commit caches and/or approval caches. A commit cache may be populated with changes that are part of a commit transaction. These may include a subset or all of the pending changes in EO cache 112, depending on how the changes are grouped for a given page submission. An approval cache may be populated with changes that are part of an approval transaction. As with the commit cache, an approval cache may be populated with a subset or all of the pending changes in EO cache 112, depending on how the changes are grouped.

Object parser 120 is configured to identify objects within EO cache 112 to add to transaction caches. Object parser 120 may parse data hierarchies and flag nodes representing entity objects that are not included in a given transaction. Object parser 120 may determine which objects to flag based on registered rules and/or object lists as described in further detail in Section 3.3 below, titled "Cache Parsing and Filtering."

Registration interface 122 allows applications and/or other users, such as client 136, to generate and register rules with transaction manager 110. When a rule or object list (collectively referred to herein as "rules") is registered, transaction manager 110 may create one or more entries within a registration table. Each entry within the registration table may correspond to a mapping between one or more user interface page objects and one or more rules. A given rule may be applicable to a single user interface page object or multiple user interface page object. A user interface page may have objects mapped to different rules.

In some embodiments, registration interface 122 includes a rule editor to facilitate creation of new rules. For example, a rule editor may provide client 136 with a GUI that guides a user through the process of defining conditions for requiring approval and/or permitting approval e 111 bypass. The rule editor may present rule templates based on commonly detected rule patterns as described further below.

Database interface 126 comprises an interface and/or communication protocol for communicating with database 128. In some embodiments, database interface 126 connects via database connection API, such as through a Java Database Connectivity (JDBC) or Open Database Connectivity (ODBC) connection string. Database interface 126 may allow transaction manager 110 to issue database queries, such as structure query language (SQL) statements to update database 128. Example update SQL statements may include, but are not limited to, INSERT statements for adding one or more new records to a table, UPDATE statements for modifying the value of one or more record attributes, and DELETE statements for removing one or more records from a table. If a database operation fails via the database connection, then an exception may be thrown to notify transaction manager 110.

Database 128 may be implemented on any type of storage unit and/or device for storing data. Further, database 128 may include multiple different storage units and/or devices. The multiple different storage units and/or devices may or may not be of the same type or located at the same physical site. Further, database 128 may be implemented or may execute on the same computing system as one or more of applications 102a-c and/or transaction manager 110. Additionally or alternatively, database 128 may be implemented or executed on a computing system separate from the other components of system 100. Database 128 may be communicatively coupled to one or more components illustrated in system 100 via a direct connection or via a network.

In some embodiments, approval manager 130 comprises a framework for defining and configuring approval processes. An approval process in this context determines the flow of an approval transaction. An approval process may include, but is not limited to, steps, paths, and stages. A step in a process represents one or more approvers or reviewers. An approver or reviewer may be a human user or an automated process that has been authenticated with approval manager 130. A path in an approval process may comprise a sequence of steps. A stage may include one or more paths. The system may execute stages sequentially. If a stage has multiple paths, then the system may execute the paths in parallel.

In some embodiments, approval manager 130 includes approval process registration engine 132 and approval process execution engine 134. Approval process registration engine 132 may provide an interface through which users, such as an application developer or administrative user, may register applications with the approval framework. Approval process registration engine 132 may register database records, user interface page elements, and/or other components that are associated with an approval transaction.

In some embodiments, a user interface page may be associated with one or more approval process definitions. Approval process registration engine 132 may maintain a mapping between the user interface objects and the corresponding process definitions that have been registered. An approval process definition may include code that determines the flow of an approval transaction. For example, an approval process definition may specify stages, paths, and steps of the approval process. The approval process definition may identify authorized approvers or reviewers for a given step within the flow. For example, approvers 138a-b may represent authorized approvers for one or more steps of an approval process.

In some embodiments, approval process execution engine 134 is configured to load and execute approval process definitions. When a new approval transaction is initiated, approval process execution engine 134 may load the relevant approval process definition and execute the corresponding stages, paths, and steps. Approval process execution engine 134 may perform a call back to transaction manager 110 to return the result of an approval transaction. Transaction manager 110 may then initiate one or more commit transactions for changes that have been approved, if any. Changes that were not approved are not saved to database 128.

In some embodiments, one or more components of system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In some embodiments, one or more comments of system 100, such as transaction manager 110 and/or approval manager 130, are implemented as a cloud service or microservice application. Additional embodiments and/or examples relating to computer networks and microservice applications are described below in Section 5.0, titled "Computer Networks and Cloud Networks" and Section 6.0, titled "Microservice Applications".

3.0 Page Model for Implementing Object-Level Transactions

3.1 Page Submissions and Process Overview

In some embodiments, a page model comprises a framework for segmenting and grouping data loaded for a given user interface page into atomic transactions. The model allows a user to initiate multiple transactions on the same page. The model further allows the user to make changes at the individual object level without waiting for completion of previously submitted changes.

Figure 2:
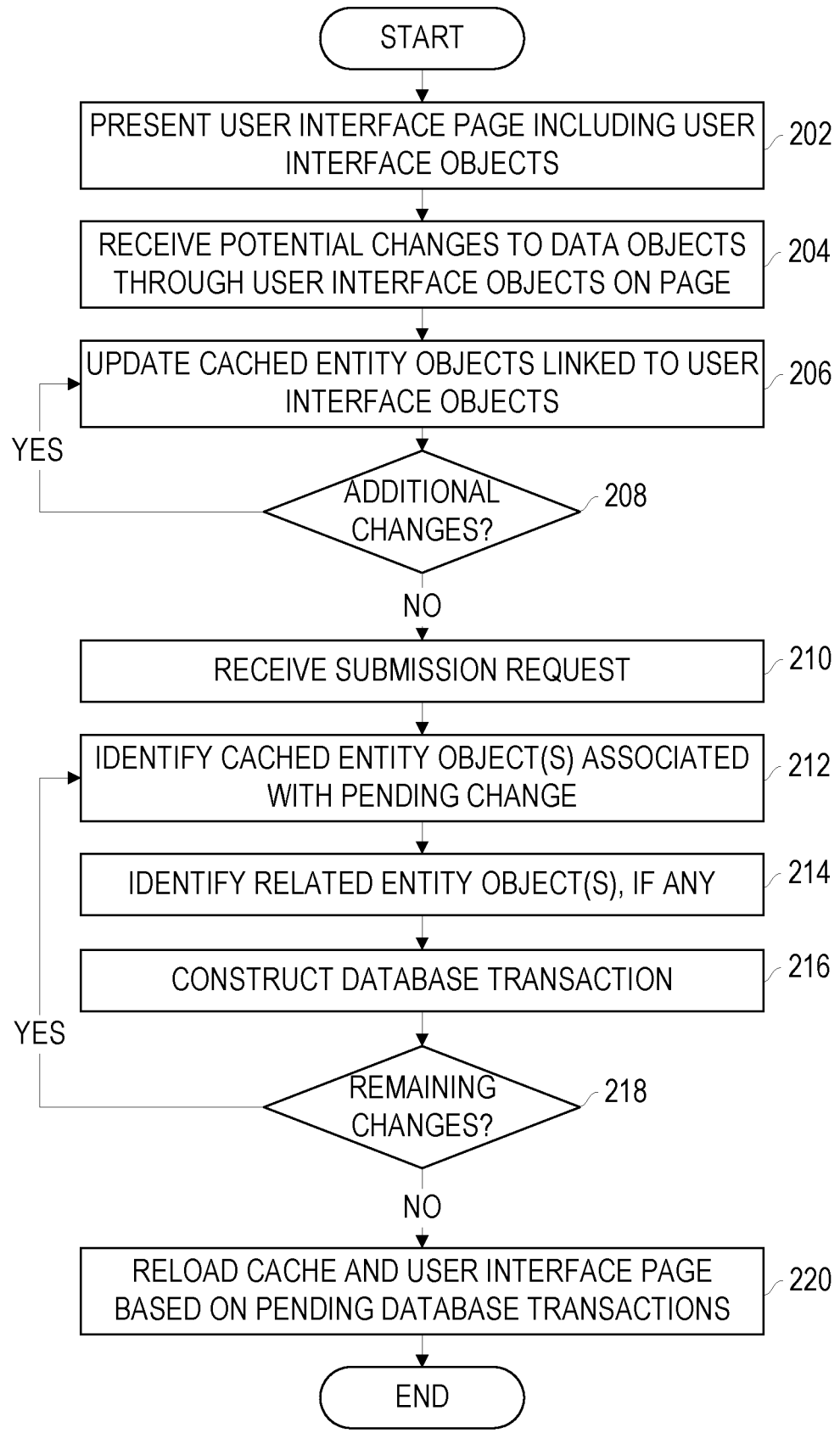
FIG. 2 illustrates an example set of operations for constructing and processing atomic transactions based on page submissions in accordance with some embodiments.

FIG. 2 illustrates an example set of operations for processing changes submitted through a user interface page in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

The process includes presenting a user interface page (operation 202). For example, the user interface page may be a webpage presented through a web browser, a page of a desktop application, or a page of a mobile application as previously described. In some embodiments, presenting the user interface page includes identifying and loading relevant data from database 128. User interface elements on a page may be mapped to or otherwise linked to entity objects in a data hierarchy. As previously mentioned, an entity object may be linked to one or more database objects, such as one or more database records. Links may be established through primary keys or other unique identifiers.

The process may identify what database data to present via the interface based on the links. For instance, a user interface page may include a set of user interface elements for presenting different attributes of an object. In the context of a Person object, for instance, one user interface element may be linked to a name, a second to an address, and a third to a phone. As another example, a Resource object corresponding to a computing resource may include fields for presenting the hostname, type of hardware resource, IP address, etc. The data that is loaded and presented may vary depending on the particular application and user interface page.

Referring again to FIG. 2, the process further includes receiving potential changes to data objects through the user interface page (operation 204). A user may input a potential change through one or more user interface objects on a user interface page. For example, a user may click on or otherwise select a button on a page to add a new entry to a list. Upon selection of the button, the user may be presented with a series of text boxes, drop-down menus, and/or other interface objects to define the new entry, such as inputting the entry name, parameters and/or other attributes. As another example, a user may input edits to existing items on the list or select one or more actions to execute that are available through the user interface.

The process further includes updating the EO cache 112 based on potential changes received through the user interface page (operation 206). In some embodiments, EO cache 112 is initially populated with entity objects corresponding to database records and/or tables used to populate the user interface. The user interface may provide information about potential changes to transaction manager 110 continuously, periodically, or upon request. A potential change may be identified based on interactions between the user and one or more interface objects. A potential change may include changes that the user has not submitted through the page interfaces. EO cache 112 may track these potential changes in real-time as the user is inputting data.

The process may continue to monitor for additional changes until a submission request is received through the page interface (operation 208). If additional changes are received, then the process may return to operation 206 to update EO cache 112.

The process further includes receiving a submission request through the user interface page (operation 210). The user may submit the request by selecting or otherwise interacting with one or more corresponding user interface elements in the user interface page. For example, the user may click on a "Submit", "OK", or "Continue" button. The interface for submitting changes may vary depending on the particular application.

The process further includes identifying one or more cached entity objects associated with a pending change (operation 212). In some embodiments, the process analyzes the links between the user interface objects on the page through which the user submitted the changes and the corresponding entity objects. For instance, if a user submits a request to change a secondary phone number to a primary phone number via a button or other user interface object. The process may determine from the page model that the user interface is linked to two entity objects: one representing the primary phone number and a second representing the secondary phone number. As previously indicated, the link may be a mapping between unique identifiers for the user interface object and unique identifiers for the entity objects. A unique identifier may be an alphanumeric string, pointer, or any other value that uniquely identifies an object.

The process further determines if any other entity objects are related to the entity objects associated with the pending change (operation 214). The entity objects at this step may include entity objects that are not being changed, but which may be relevant to the transaction. Additionally or alternatively, the entity objects may include other entity objects that have changes pending that are related and to be grouped as part of the same atomic transaction. The entity objects may be identified based on registered rules or object lists, as described further below.

The process next constructs a database transaction based on the identified entity objects (operation 216). A database transaction may be a commit or approval transaction, depending on rules registered with the interface. To construct a transaction, the process may allocate memory for a transaction cache on the fly or it may have been pre-allocated, depending on the particular implementation. For a commit transaction, the process may generate a database query based on the entity objects associated with submitted changes. For instance, the process may generate a standard query language (SQL) statement, such as an UPDATE, INSERT, DELETE, and/or any other Data Manipulation Language (DML) statement. In the example where a user changes a secondary phone number to the primary phone number, the database transaction may include two UPDATE operations: one to change the primary phone number and another to change the secondary phone number. The transaction may be handled atomically such that if one of the updates fails, then the other update is rolled back or not executed.

The process determines whether there are further changes to analyze for the page submission (operation 218). If there are remaining changes, then the process may iterate through operations 212-216 for one or more additional changes to construct additional database transactions. Thus, multiple atomic transactions may be constructed for the same page submission.

The process further includes reloading EO cache 112 and the user interface page based on the pending database transactions (operation 220). In some embodiments, entity objects that are pending approval or a commit are flagged within EO cache 112. A rendering engine for generating and presenting the reloaded user interface page may identify which entity objects have been flagged. The rendering engine may then label page regions and/or individual user interface objects that are linked to entity objects with pending changes. The rendering engine may omit and/or modify one or more user interface elements from the page to lock certain page regions, as discussed further below.

3.2 Object Relationship Rules and Definitions

In some embodiments, the page model defines associations between user interface objects, entity objects, and database objects. The relationships may be used to segment and group submitted changes into atomic transactions. Changes to entity objects that are related may be grouped in the same atomic transaction to maintain data consistency and integrity. Changes to entity objects that are unrelated may be separated into separate database transactions.

Figure 3:
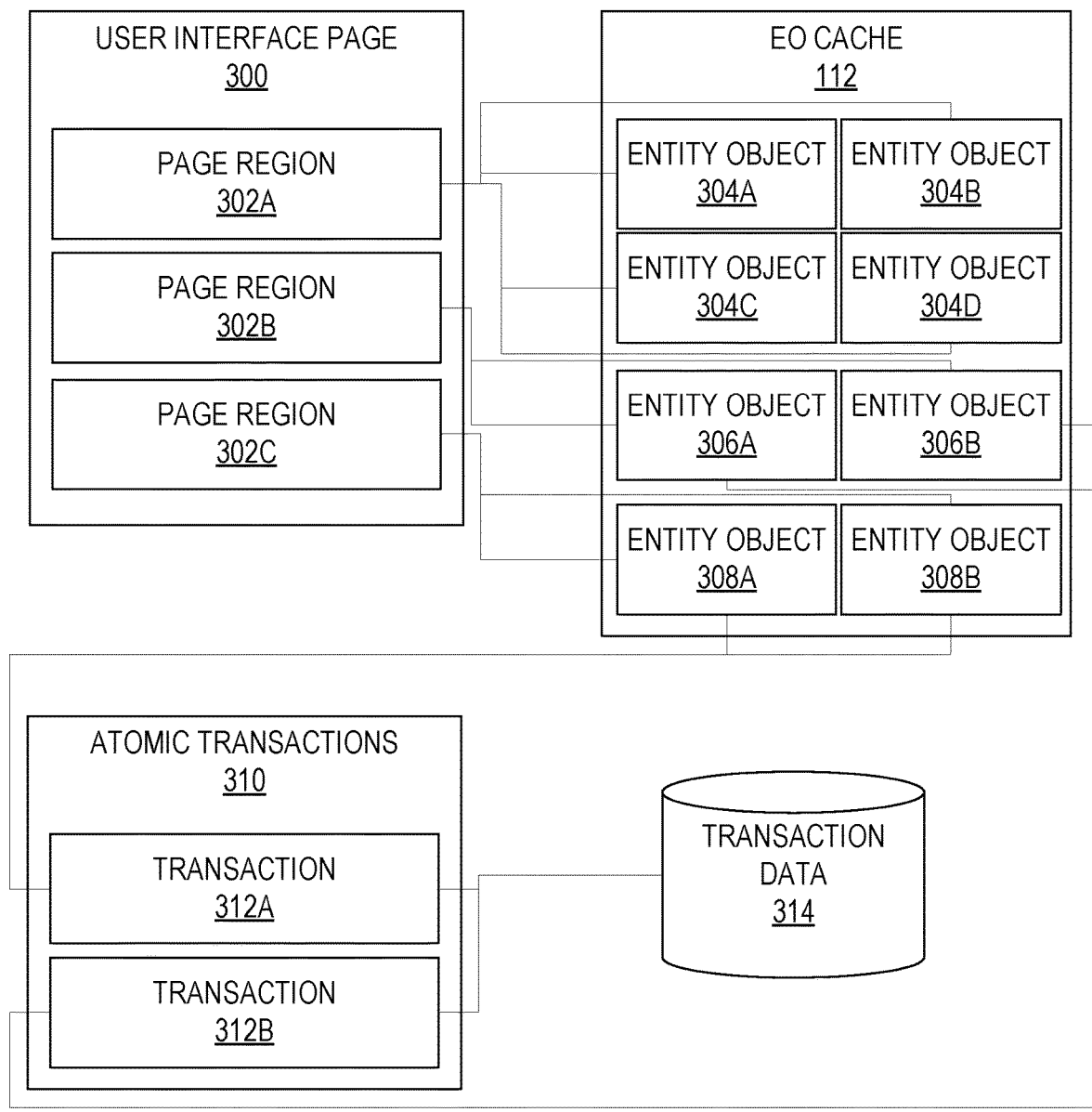
FIG. 3 illustrates an example set of links between page regions and entity objects for constructing atomic transactions in accordance with some embodiments.

FIG. 3 illustrates an example set of links between page regions and entity objects for constructing atomic transactions in accordance with some embodiments. User interface page 300 includes page regions 302a-c. Each page region is linked to entity objects within EO cache 112. For example, page regions 302a is linked to entity objects 304a-d, page region 302b is linked to entity objects 306a-b, and page region 302c is linked to entity objects 308a-b. The number of page regions and links per page region may vary depending on the particular implementation.

In some embodiments, when user interface page 300 is initially launched, the transaction framework loads EO objects 304a-b. entity objects 306a-b, and entity objects 308a-b into cache 112. The transaction framework may check transaction data 314 to determine whether any of the entity objects have pending changes. It is noted that pages to an entity object may be initiated by another user interface page that is part of the same application flow or a different application flow as database 128 may be shared across multiple users and applications. The transaction framework may flag any entity objects that have changes pending. User interface page 300 and page regions 302a-c may be generated and rendered based on any pending changes. For example, a page region with a pending change may be labeled and/or locked, as discussed further below.

When a user submits a change through user interface page 300, the transaction framework constructs one or more atomic transactions based on the defined relationships. For example, if a user makes changes through page region 302b-c, then atomic transactions 310 may include transaction 312a for processing submitted changes to entity objects 308a-b and transaction 312b for processing submitted changes to entity objects 306a-b. Transaction data 314 for the different transaction may be separated into different caches to facilitate processing.

Transaction data 314 may include SQL statements or information that may be used to constructed SQL statements or other database queries. For example, a user may input a phone number change through page region 302b, which is linked to entity objects 306a-b. As previously mentioned, the entity objects may be linked to database records, such as through a primary key. The transaction framework may then generate an UPDATE statement for the target database records binding the value submitted through user interface page 300.

In some embodiments, clients, such as application developers, register object relationship rules and/or definitions with the transaction framework. The rules may define relationships that control how submitted changes are segmented and grouped into transactions. As an example, a develop may register, for a page region or other user interface object, a list that includes identifiers for one or more entity objects. When a change is submitted through the user interface object, the transaction framework may determine which objects are related to the change object based on the registered list. If changes are submitted through different fields that target related entity objects, then the changes may be grouped together. Changes that are not related may be separated into different transactions.

3.3 Parsing and Filtering Hierarchical Data for Caching

In some embodiments, EO cache 112 maintains a hierarchical document representation of a user interface page, including nodes that correspond to different entity objects used to populate data. The hierarchical document representation may reflect a parent-child structure, which may run multiple levels deep. For example, a user interface page for displaying pending projects may include an entity object corresponding to a project at the top level, which is linked to a set of child entity objects representing resources assigned to the project. Each resource entity object may have a parent-child relationship with entity objects representing resource attributes. A resource attribute may further have child objects representing sub-attributes. The data hierarchy may vary depending on the particular application.

In some embodiments, the hierarchical document representation is stored in a format that facilitates encoding of data relationships. Examples include, but are not limited to, extensible markup language (XML) and JavaScript Object Notation (JSON) documents. Examples provided below are depicted in XML. However, other formats may be used, depending on the particular implementation.

In some embodiments, constructing a transaction cache includes retaining nodes in the hierarchical document representation that are targeted by an atomic transaction and removing the other nodes. The nodes that are retained may include, but are not limited to, nodes representing entity objects on a registered object list and nodes which are parents of the entity objects on the registered object list. It is noted that the parent nodes may have other pending changes removed from the cache if the parent nodes are not themselves on the object list. The other nodes may be removed such that the corresponding entity objects are not reloaded or locked when not wanted.

In some embodiments, object parser 120 is configured to parse the hierarchical document representation for a user interface page upon a page submission and extract the appropriate nodes for a transaction cache. Object parser 120 may parse the document until a low-level is node, such as a leaf node, is detected. Object parser 120 may then determine whether to retain or remove the node based on the object list registered for the page region. Once all leaf nodes have been processed, object parser 120 may climb back up through the parent nodes to determine if any parent nodes have a child node that will be retained or if the parent node is included on the object list. If not, then the parent nodes may also be removed. Otherwise, the parent node may be retained. A parent node that is not on the object list may be modified to serve as a reference for the data model but to prevent changes to the parent node themselves.

Figure 4:
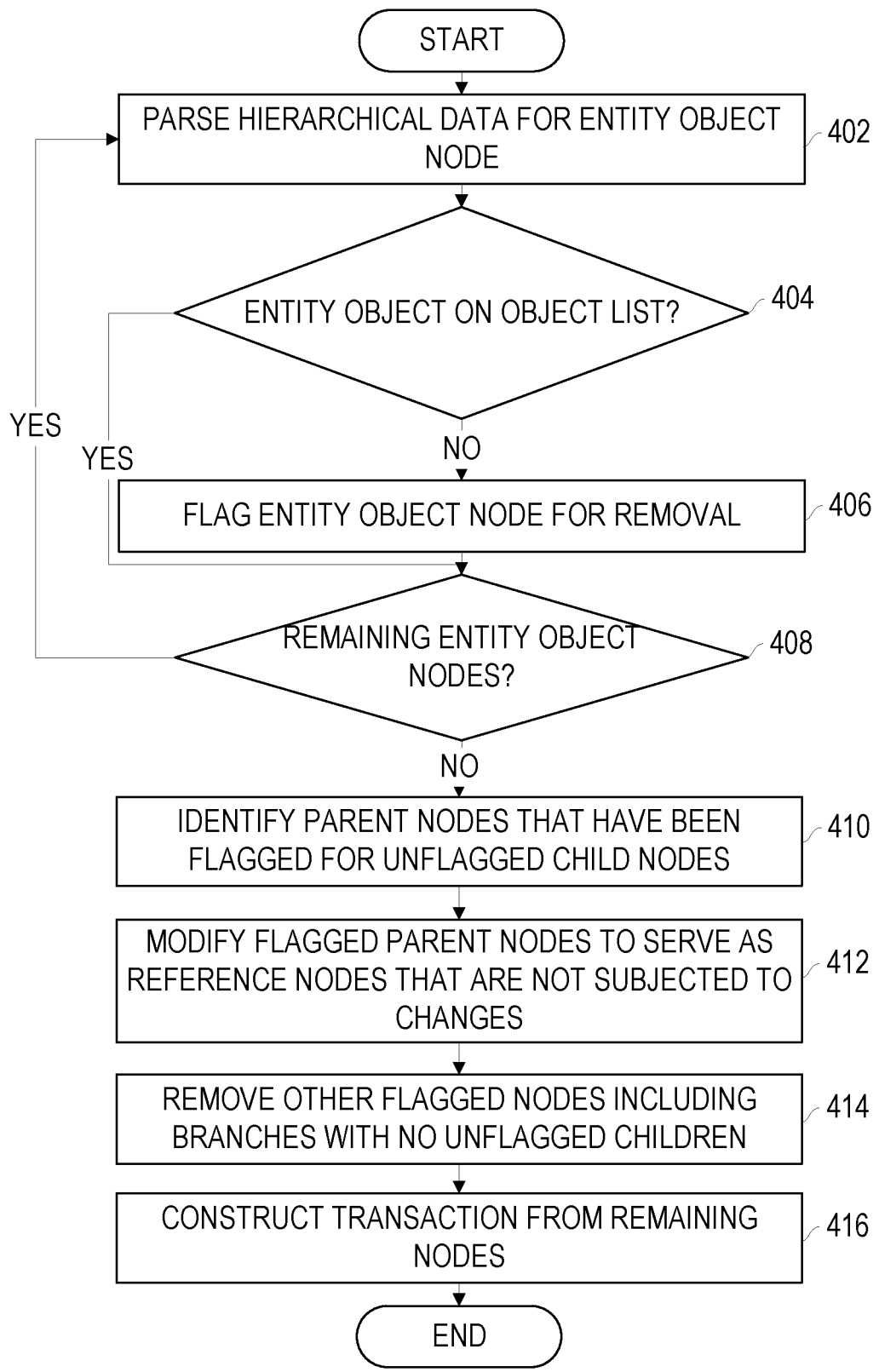
FIG. 4 illustrates an example set of operations for parsing an object hierarchy to construct a transaction in accordance with some embodiments.

FIG. 4 illustrates an example set of operations for parsing an object hierarchy to construct a transaction in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

The process includes parsing the hierarchical data for an entity object node (operation 402). As previously mentioned, object parser 120 may begin with leaf nodes and then move to parent nodes. For example, object parser 120 may crawl XML or JSON data until an entity object node is identified that does not have another entity object child node.

The process next determines whether the entity object is on the object list registered for the page region (operation 404).

If the entity object is not on the object list, then the process flags the entity object node for removal (operation 406). Removing nodes from XML during the crawling process may result in erratic errors during the analysis. Therefore, adding flags may be more reliable. A flag may be a bit or other value that is associated with the node. In other embodiments, the flags that are to be retained may be flagged instead of or using a different marker than the objects that are to be removed.

The process further determines if there are any remaining entity object nodes in the hierarchical data representation to analyze (operation 408). If so, then the process returns to operation 402 and iterates through the remaining entity object nodes. Once all nodes have been processed, the result may be a set of one or more nodes that have been flagged for removal and a set of one or more unflagged nodes.

The process further identifies parent nodes that have been flagged but that have one or more unflagged child nodes (operation 410). A flag in this context signifies that the parent node was not on the object list. As a result, changes submitted to the parent node are not included in the current transaction. For example, a change to Person object may be submitted to transfer the corresponding person entity from one project to another. Another change may be concurrently submitted to update the phone number that is a child node of the Person object. If the Person object has been flagged, then the changes are processed in separate database transactions.

The process next modifies flagged parent nodes to serve as reference nodes that are not subjected to changes (operation 412). In some embodiments, the parent nodes are modified by adding a flag and/or having the node value set to '0' to indicate that the node is only retained as a reference for the page model. Retaining a reference node may facilitate transaction processing to determine which child node is to be modified. For example, a transaction to change to a phone number may use a reference to the parent Person object to identify the corresponding database record.

The process further removes other flagged nodes including branches in the data hierarchy without unflagged children (operation 414). The nodes may be removed by deleting the corresponding XML or other encoded data from the cache. Thus, the entity objects are no longer included in the transaction data. Any changes submitted to these nodes may be processed in separate transactions.

The process then constructs a transaction from the remaining nodes in the data hierarchy (operation 416). For example, one or more SQL statements and/or other database operations may be generated as previously described.

3.4 Object-Level Approval Transaction Processing

In some embodiments, approval process registration engine 132 may register different approval process flows for different page regions and/or other user interface objects. For example, an application developer may submit different approval process flows for page regions 302a-302c. When a change is submitted through user interface page 300, transaction manager may initiate separate approval transactions based on the links. For example, transaction 312a may correspond to an approval transaction for entity objects 308a-b, and transaction 312b may correspond to an approval transaction for entity objects 308a-b.

When an approval transaction is initiated, approval manager 130 may identify one or more approval process definitions associated with a page region or other user interface object. For example, approval manager 130 may search a mapping table to determine which approval process definitions have been registered with page regions 302a-c. Approval process execution engine 134 may then load and execute the identified approval process definition. In some embodiments, approval process execution engine 134 identifies the stages, paths, and/or steps in the process definition. Approval process execution engine 134 may execute multiple paths in a given stage in parallel. Steps in the same path may be executed sequentially.

As previously mentioned, a step in an approval process may represent one or more approvers, where an approver may be a human user or an automated process. In some embodiments, execution of a step may include notifying each approver in the step. For example, approval process execution engine 134 may send each approver an email or add the notification to a worklist that is accessible through the approver's account.

If there are multiple approvers for a given step or stage, then the approval process definition may define conditions for granting approval. For example, a step or stage may only be approved in some cases if all approvers approve of a given transaction. As another example, approval may be granted if a majority of approvers grant approval, even if one denies approval. In yet another example, one approver may override another approver and/or approvers may be assigned different weights.

In some embodiments, an approval process definition may include code for defining or linking to an automatic approval process. For example, an automated process for a given step may automatically approve updates that are less than a threshold. If the automated process does not approve the update, then the transaction may be routed to a human user for further review or approval may be automatically denied, depending on the implementation. The process may define any other logic as a function of changes/database operations to automatically approve or prevent a transaction for commit.

The approval framework may handle approval transactions atomically. Thus, the transaction may either be approved or fail as a unit. In other embodiments, the approval framework may allow for individual line items to be independently approved or denied. For example, an approval transaction may comprise an update to an address and phone number. The approval process may approve both updates, approve only one of the updates and deny the other, or deny both updates. Approved changes may be persisted to database 128 via a commit transaction while denied changes are omitted from any commit transactions stemming from the approval transaction results.

4.0 Data Concurrency and Consistency Controls

4.1 Page Loading and Lock Management

In some embodiments, multiple application instances may concurrently access data from database 128. One approach to maintain data consistency is to issue locks at the data layer. For example, database 128 may issue row-level or table-level locks for rows with pending changes to prevent multiple users from submitting concurrent changes to the same database objects. Another approach is to lock a user interface page that has submitted changes until the changes have been committed. However, these approaches may lead to inefficiencies increasing application and user wait times.

In some embodiments, transaction manager 110 is configured to maintain locks on entity objects for which changes are pending. For example, when a user submits changes through a user interface page, the entity objects may be filtered and added to a transaction cache per the techniques previously described. Transaction manager 110 may then grant a lock on each entity object in the transaction cache until the database transaction is committed, denied, or fails.

In some embodiments, when an entity object is locked, a rendering engine is configured to render page regions and/or other user interface objects in a manner that prevents users from submitting further changes on the entity object. When a page is loaded or refreshed, transaction manager 110 may analyze the page model to identify the links between the user interface objects on the page and the entity objects in the hierarchical data representation. Transaction manager 110 may then search the transaction data for locks on any of the entity objects linked to the page. If a lock is detected, then the rendering engine may be configured to generate a user interface that is different than it would be if no lock was present. In some embodiments, the rendering engine may omit or modify one or more user interface objects to prevent the user from submitting changes. For example, an "Edit" or "Submit" button may be omitted that would otherwise be present, a text field may be locked to prevent typing, or a drop down menu may be disabled. Additionally or alternatively, other user interface modifications may be made to prevent the user from submitting changes to the entity objects.

In some embodiments, when a lock is present, only a portion of the user interface page is rendered in a manner that prevents further changes. The rendering engine may render one or more other page regions in a manner that allows the user to submit changes to entity objects that are not part of the pending transaction. A user may submit multiple and initiate multiple atomic transactions through a user interface page even before changes previously submitted through the page have been committed. For example, a user may submit a change to a telephone number of Person A through a page. The pending change may cause an approval transaction to be initiated. The page may then be refreshed to reflect the lock on the phone number field. Thus, the user or other users concurrently accessing Person A's phone number information may be prevented from submitting further changes to the phone number until the previously submitted transaction is committed or otherwise resolved. However, the user may be allowed to submit changes to other attributes of Person A through the refreshed user interface page. For example, the user may then submit an address change. This change may initiate a new atomic transaction, which may be committed before the phone number change depending on the transaction processing for each separate change.

Additionally or alternatively, transaction manager 110 may allow for flexible locking. In some cases, transaction manager 110 may not lock entity objects that are included in a transaction. If a subsequent change is submitted while the transaction is still pending, then the initial transaction may be withdrawn, and a new transaction may be generated based on the most recent change. Transaction manager 110 may send an alert when a transaction is withdrawn to notify a user.

In other cases, transaction manager 110 may allow locks to be overridden if certain criteria are specified. For instance, a user having a higher clearance level may be allowed to override transactions submitted by users with lower clearance levels. Thus, the rendering engine may determine how to render a user interface page with a lock based in part on the clearance level of a user. In the preceding example, a user with a clearance level above a threshold may have access to user interface objects that allow the user to submit changes even when a transaction is pending. These objects may be omitted or modified, as previously discussed, to prevent changes from users with clearance levels that do not satisfy the threshold.

Additionally or alternatively, transaction manager 110 may implement application-specific conflict resolution rules when multiple applications are concurrently attempting to modify the same entity object. Example conflict resolution rules are described in U.S. Provisional Patent Application 62/857,760, titled "Application Driven Data Change Conflict Handling System", previously incorporated by reference.

Figure 5:
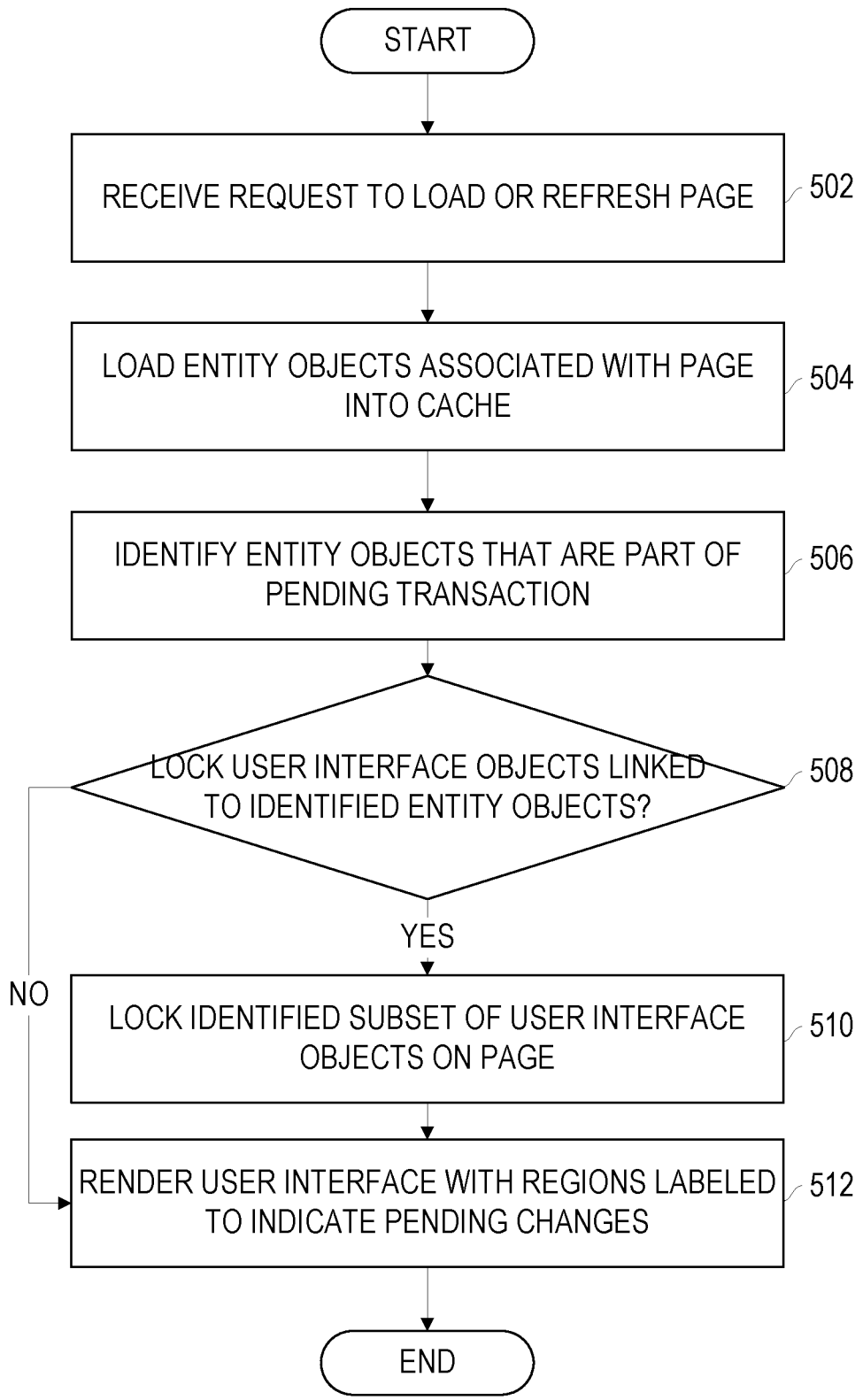
FIG. 5 illustrates an example interface for managing locks on page regions in accordance with some embodiments.

FIG. 5 illustrates an example set of operations for parsing an object hierarchy to construct a transaction in accordance with some embodiments. One or more operations illustrated in FIG. 5 may be modified, rearranged, or omitted all together. Accordingly, the particular sequence of operations illustrated in FIG. 5 should not be construed as limiting the scope of one or more embodiments.

The process includes receiving a request to load or refresh a user interface page (operation 502). When a page is initially loaded, a request to change an entity object may have been made by another user through the same application page or by another user interface page of a different application flow.

Responsive to the request, the process loads entity objects associated with the user interface page into EO cache 112 (operation 504).

The process further includes identifying entity objects that are part of pending transactions (operation 506).

The process next determines whether to lock user interface objects linked to the identified entity objects (operation 508). In some cases, locks may always be granted on entity objects with pending transaction. In other cases, locks are never granted or may vary depending on whether lock criteria, such as whether the user satisfies a clearance threshold as previously described.

To block further changes while a transaction is pending, the process may lock a subset of user interface objects on the page (operation 510). As previously mentioned, locking the subset of user interface objects may include omitting or modifying the user interface objects to prevent changes from being submitted by a user accessing the page. The changes may be made to the page's HTML, JavaScript, or other code used for rendering by a rendering engine. Changes to other entity objects may still be submitted through another subset of user interfaces objects on the page that have not been locked.

The process then renders the user interface with page regions labeled to indicate pending changes (operation 512). For example, in the example depicted in FIG. 3, page region 302*b* and 302*c* may be locked and/or labeled based on transactions 312*a* and 312*b*, which are linked to entity objects 306*a-b* and 308*a-b*, respectively. Page region 302*a* may be rendered normally since there are no pending atomic transactions linked to entity objects 304*a-d*. The label may include text and/or other visual indicators to notify a user viewing the page of the pending changes.

4.2 Example User Interface Page Processing

FIG. 6 illustrates example user interface page 600 for submitting changes to a database that allows for further submissions when a previous submission is pending in accordance with some embodiments. User interface 600 includes page regions 602 and 606 for changing the personal attributes for a given Person object. In the example depicted, page region 606 is locked with a notification that changes to the demographic information for the Person object is pending approval. Page region 602 is not locked, allowing a user to submit a name change. This region includes user interface objects for indicating the date of the change, an updated last name, first name, suffix, and/or middle name. Page region 602 further allows for comments and attachments to be submitted as part of the transaction. The user may input the changes through via these user interface objects and select button 604 to submit the changes. These changes may be submitted and a new transaction generated before the pending approval transaction reflected in page region 606 has been resolved.

When a user submits changes to the name change via user interface 600, the process may construct a new atomic transaction by filtering and extracting nodes from the hierarchical data representation, as previously described. For example, an application may submit a request for a change for a Person object with PersonName and PersonNameID primary key attributes of 100010034148146. An example XML data hierarchy for the page may be represented as shown below in TABLE 1.

TABLE 1

EXAMPLE DATA HIERARCHY REPRESENTATION FOR A PAGE MODEL

<BUSINESSDATA>
<AM.MomVer="0".ver="10">
...<cd/>
...<TXN.Def="1".New="0".Lok="2".tsi="6".pcid="2656">
......<EO.Name="oracle.apps.hcm.addresses.publicModel.entity.AddressDEO">
.........<![CDATA[00030000000EACED0005770F6DD140078]]>
.........<AddressDEORow.PS="2".Hdl="1".Effm="1".AV="">
............<TownOrCity>
...............<DATA>Riverside</DATA>
............</TownOrCity>
............<Region1>
...............<DATA>COOK</DATA>
............</Region1>
............<Region2>
...............<DATA>IL</DATA>
............</Region2>
............<PostalCode>
...............<DATA>60546</DATA>
............</PostalCode>
............<ObjectVersionNumber>
...............<DATA>1</DATA>
............</ObjectVersionNumber>
............<GeographyElement2>
...............<DATA>IL</DATA>
............</GeographyElement2>
.........</AddressDEORow>
......</EO>
......<EO.Name="oracle.apps.hcm.people.core.protectedModel.entity.PersonEO">
.........<![CDATA[00010000000EACED0005770800005AF5668F3331]]>
.........<PersonEORow.PS="1".Hdl="15".AV="">
............<ObjectVersionNumber>
...............<DATA>1</DATA>
............</ObjectVersionNumber>
............<CEO>
...............<EO.Name="oracle.apps.hcm.people.core.protectedModel.entity.PersonNameDEO">
..................<![CDATA[00030000000EACED0005770800005AF5668F33320000004AACE007870770800004EB9F6DD140078]]>
..................<PersonNameDEORow.PS="0".Hdl="36".PK="Y".CI="Y".EFFDT="2017-06-02".AV="">
.....................<PersonNameId>
........................<DATA>100010034148146</DATA>
.....................</PersonNameId>
.....................<EffectiveStartDate>
........................<DATA>2001-01-01</DATA>
.....................</EffectiveStartDate>
.....................<EffectiveEndDate>

TABLE 1-continued

EXAMPLE DATA HIERARCHY REPRESENTATION FOR A PAGE MODEL

```
....................<DATA>4712-12-31</DATA>
................</EffectiveEndDate>
................<PersonId>
....................<DATA>100010034148145</DATA>
................</PersonId>
................<BusinessGroupId>
....................<DATA>100010025071996</DATA>
................</BusinessGroupId>
................<LegislationCode>
....................<DATA>US</DATA>
................</LegislationCode>
................<NameType>
....................<DATA>GLOBAL</DATA>
................</NameType>
................<LastName>
....................<DATA>Moss</DATA>
................</LastName>
................<FirstName>
....................<DATA>Veda</DATA>
................</FirstName>
............</PersonNameDEORow>
........</EO>
........<EO.Name="oracle.apps.hcm.people.core.protectedModel.entity.PersonNameDEO">
............<![CDATA[00030000000EACED0005770800005AF5668F381014B59741903000
07870770800004EB9F6DD140078]]>
............<PersonNameDEORow.PS="2".Hdl="37".Effm="0".PK="Y".EFFDT="2017-06-
01".AV="">
................<EffectiveEndDate>
....................<DATA>2000-12-31</DATA>
................</EffectiveEndDate>
................<DisplayName>
....................<DATA>Veda.Moss</DATA>
................</DisplayName>
................<FullName>
....................<DATA>Moss,.Veda</DATA>
................</FullName>
................<ListName>
....................<DATA>Moss,.Veda</DATA>
................</ListName>
................<OrderName>
....................<DATA>Moss.Veda</DATA>
................</OrderName>
................<ObjectVersionNumber>
....................<DATA>1</DATA>
................</ObjectVersionNumber>
................<LastUpdateDate>
....................<DATA>2010-06-02.02:35:16.0</DATA>
................</LastUpdateDate>
................<LastUpdateLogin>
....................<DATA>FUSION_GBI_TEST_DATA_SCRIPT</DATA>
................</LastUpdateLogin>
................<LastUpdatedBy>
....................<DATA>FUSION_GBI_TEST_DATA_SCRIPT</DATA>
................</LastUpdatedBy>
............</PersonNameDEORow>
........</EO>
............</PersonNameDEORow>
........</EO>
........<EO.Name="oracle.apps.hcm.people.core.protectedModel.entity.PersonLegislativeInfoDEO">
............<![CDATA[00030000000EACED0005770800005AF5668F333B0014B597419030
0007870770800004EB9F6DD140078]]>
............<PersonLegislativeInfoDEORow.PS="0".Hdl="16".PK="Y".CI="Y".EFFDT="201
7-06-02".AV="">
................<PersonLegislativeId>
....................<DATA>100010034148155</DATA>
................</PersonLegislativeId>
................<EffectiveStartDate>
....................<DATA>2001-01-01<7DATA>
................</EffectiveStartDate>
................<EffectiveEndDate>
....................<DATA>4712-12-31</DATA>
................</EffectiveEndDate>
................<PersonId>
....................<DATA>100010034148145</DATA>
................</PersonId>
................<BusinessGroupId>
```

TABLE 1-continued

EXAMPLE DATA HIERARCHY REPRESENTATION FOR A PAGE MODEL

```
....................<DATA>100010025071996</DATA>
....................</BusinessGroupId>
....................<LegislationCode>
....................<DATA>US</DATA>
....................</LegislationCode>
....................<Sex>
....................<DATA>F</DATA>
....................</Sex>
....................<ObjectVersionNumber>
....................<DATA>3</DATA>
....................</ObjectVersionNumber>
....................<CreatedBy>
....................<DATA>FUSION_GBI_TEST_DATA_SCRIPT</DATA>
....................</CreatedBy>
....................<CreationDate>
....................<DATA>2010-06-02.02:35:16.0</DATA>
....................</CreationDate>
....................<LastUpdatedBy>
....................<DATA>FUSION_GBI_TEST_DATA_SCRTPT</DATA>
....................</LastUpdatedBy>
....................<LastUpdateDate>
....................<DATA>2010-06-02.02:35:16.0</DATA>
....................</LastUpdateDate>
....................<LastUpdateLogin>
....................<DATA>FUSION_GBI_TEST_DATA_SCRIPT</DATA>
....................</LastUpdateLogin>
....................</PersonLegislativeInfoDEORow>
................</EO>
................<EO.Name="oracle.apps.hcm.people.core.protectedModel.entity.PersonLegislativeInfoDEO">
................<![CDATA[00030000000EACED0005770800005AF5668F333B00000045974190
300007870770800004EB9F6DD140078]]>
................<PersonLegislativeInfoDEORow.PS="2".Hdl="17".Effm="0".PK="Y".EFFDT="2
017-06-01".AV="">
....................<PersonLegislativeId>
....................<DATA>100010034148155</DATA>
....................</PersonLegislativeId>
....................<EffectiveEndDate>
....................<DATA>2000-17-31</DATA>
....................</EffectiveEndDate>
....................<ObjectVersionNumber>
....................<DATA>1</DATA>
....................</ObjectVersionNumber>
....................<LastUpdatedBy>
....................<DATA>FUSION_GBI_TEST_DATA_SCRIPT</DATA>
....................</LastUpdatedBy>
....................<LastUpdateDate>
....................<DATA>2010-06-02.02:35:16.0</DATA>
....................</LastUpdateDate>
....................<LastUpdateLogin>
....................<DATA>FUSION_GBI_TEST_DATA_SCRIPT</DATA>
....................</LastUpdateLogin>
................</PersonLegislativeInfoDEORow>
................</EO>
............</CEO>
.........</PersonEORow>
......</EO>
...</TXN>
</AM>
</BUSINESSDATA>
</TRANSACTION>
```

Upon submitting the name change, transaction manager 110 may remove all the nodes except for the ones on the object list and the parent nodes, as shown in bold, to leave a stripped down data model. The result is reflected in TABLE 2 below.

TABLE 2

EXAMPLE CACHE OF CHANGES AFTER FILTERING

```
<BUSINESSDATA>
<AM.MomVer="0".ver="10">
...<cd/>
```

TABLE 2-continued

EXAMPLE CACHE OF CHANGES AFTER FILTERING

```
...<TXN.Def="1".New="0".Lok="2".tsi="6".pcid="2656">
......<EO.Name="oracle.apps.hcm.people.core.protectedModel.entity.PersonEO">
.........<![CDATA[00010000000EACED0005770800005AF5668F3331]]>
.........<PersonEORow.PS="1".Hdl="15".AV="">
............<ObjectVersionNumber>
...............<DATA>1</DATA>
............</ObjectVersionNumber>
............<CEO>
...............<EO.Name="oracle.apps.hcm.people.core.protectedModel.entity.PersonNameD
EO">
..................<![CDATA[00030000000EACED0005770800005AF5668F33320000004AACE0
07870770800004EB9F6DD140078]]>
..................<PersonNameDEORow.PS="0".Hdl="36".PK="Y".CI="Y".EFFDT="2017-
06-02".AV="">
.....................<PersonNameId>
........................<DATA>100010034148146</DATA>
.....................</PersonNameId>
.....................<EffectiveStartDate>
........................<DATA>2001-01-01</DATA>
.....................</EffectiveStartDate>
.....................<EffectiveEndDate>
........................<DATA>4712-12-31</DATA>
.....................</EffectiveEndDate>
.....................<PersonId>
........................<DATA>100010034148145</DATA>
.....................</PersonId>
.....................<BusinessGroupId>
........................<DATA>100010025071996</DATA>
.....................</BusinessGroupId>
.....................<LegislationCode>
........................<DATA>US</DATA>
.....................</LegislationCode>
.....................<NameType>
........................<DATA>GLOBAL</DATA>
.....................</NameType>
.....................<LastName>
........................<DATA>Moss</DATA>
.....................</LastName>
.....................<FirstName>
........................<DATA>Veda</DATA>
.....................</FirstName>
..................</PersonNameDEORow>
...............</EO>
......</EO>
...</TXN>
</AM>
</BUSINESSDATA>
</TRANSACTION>
```

The above cache of changes may be stored and later reloaded without disturbing any other pending changes. In the example, the attribute value PersonNameDEORow.PS of the parent node is modified from "2" to "0" to serve as a reference, but the parent node is not changed itself as part of the atomic transaction.

5.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
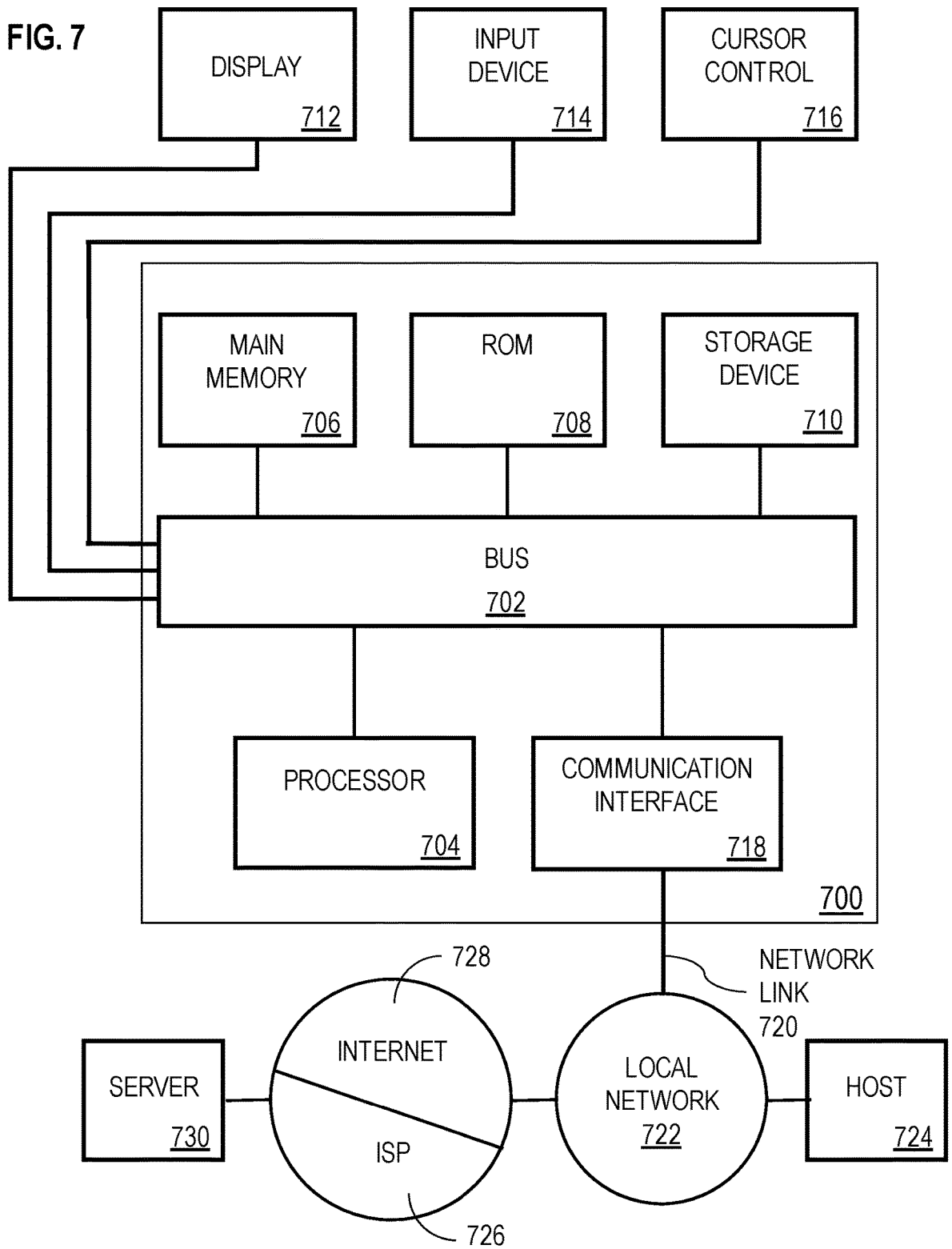
FIG. 7 shows a block diagram that illustrates a computer system in accordance with one or more embodiments.

For example, FIG. 7 is a block diagram that illustrates computer system 700 upon which an embodiment of the invention may be implemented. Computer system 700 includes bus 702 or other communication mechanism for communicating information, and a hardware processor 704 coupled with bus 702 for processing information. Hardware processor 704 may be, for example, a general purpose microprocessor.

Computer system 700 also includes main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes read only memory (ROM) 708 or other static storage device coupled to bus 702 for storing static information and instructions for processor 704. Storage device 710, such as a magnetic disk or optical disk, is provided and coupled to bus 702 for storing information and instructions.

Computer system 700 may be coupled via bus 702 to display 712, such as a cathode ray tube (CRT) or light emitting diode (LED) monitor, for displaying information to a computer user. Input device 714, which may include alphanumeric and other keys, is coupled to bus 702 for communicating information and command selections to processor 704. Another type of user input device is cursor control 716, such as a mouse, a trackball, touchscreen, or cursor direction keys for communicating direction information and command selections to processor 704 and for controlling cursor movement on display 712. Input device 714 typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 700 can receive the data on the network line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

8.0 Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which, when executed by one or more hardware processors, cause:
   receiving, through a page of a user interface, a first request to change at least a first data object;
   generating, based on the first request, a first cache of transaction data for a first atomic transaction to modify the first data object in a database, wherein generating the first cache of transaction data includes modifying a set of nodes in a hierarchical representation of the page by removing at least a first node from the hierarchical representation of the page that is not a target of the first atomic transaction, wherein removing the first node prevents at least a second data object corresponding to the first node from being locked;
   before the first atomic database transaction has committed to the database:
      receiving, through the page of the user interface, a second request to change at least the second data object;
      generating, based on the second request, a second atomic transaction to modify the second object in the database; and
      executing the second atomic transaction independently of the first atomic transaction, wherein the first atomic transaction is executed using the first cache of transaction data.

2. The one or more non-transitory computer-readable media of claim 1, wherein the instructions further cause: updating the page of the user interface based on the first atomic transaction to indicate that the first atomic transaction is pending.

3. The one or more non-transitory computer-readable media of claim 2, wherein the updated page includes a label for a first page region within the user interface that indicates that the first atomic transaction is pending; wherein a second page region does not include the label.

4. The one or more non-transitory computer-readable media of claim 2, wherein the updated page locks a set of one or more user interface objects of a first page region of the user interface page to prevent further changes from being submitted while the first atomic transaction is pending; wherein a second set of one or more user interface objects of a second region of the user interface page are not locked, wherein the second set of one or more user interface objects are received through the second set of one or more user interface objects.

5. The one or more non-transitory computer-readable media of claim 1, wherein the instructions for generating the first cache of transaction data comprise instructions that cause filtering nodes from the hierarchical data representation based at least in part on what data objects are linked to a page region through which the change to the first data object was submitted.

6. The one or more non-transitory computer-readable media of claim 1, wherein the instructions for generating the first cache of transaction data comprise instructions that cause flagging nodes that are not on a list of data objects; removing flagged nodes that do not have any unflagged children nodes within the hierarchical data representation; and modifying flagged parent nodes that have at least one unflagged child node to serve as a reference node in the first cache of transaction data.

7. The one or more non-transitory computer-readable media of claim 1, wherein the instructions further cause locking one or more user interface objects on the page of the user interface based at least in part on the first cache of transaction data.

8. The one or more non-transitory computer-readable media of claim 1, wherein the instructions further cause locking one or more user interface objects on a second page for a different application flow based at least in part on the first cache of transaction data.

9. The one or more non-transitory computer-readable media of claim 1, wherein the first atomic transaction includes a first approval transaction to seek approval from a first set of one or more approvers to commit the change to the first data object to the database and the second atomic transaction includes a second approval transaction to seek approval from a second set of one or more approvers to commit the change to the second data object to the database; wherein the first set of one or more approvers are different than the second set of one or more approvers.

10. The one or more non-transitory computer-readable media of claim 9, wherein the first approval transaction includes sending a first notification to a first set of one or more users that have been authenticated as approvers in the first set of one or more approvers and the second approval transaction includes sending a second notification to a second set of one or more users that have been authenticated as approvers in the second set of one or more approvers.

11. The one or more non-transitory computer-readable media of claim 9, wherein the instructions further comprise preventing at least one change in the first approval transaction from being committed to the database responsive to at least one authorized approver denying the at least one change.

12. The one or more non-transitory computer-readable media of claim 9, wherein the first approval transaction passes through a first chain of approvers defined by a first approval process definition registered with a first region of the user interface page and the second approval transaction passes through a second chain of approvers defined by a second approval process definition registered with a second region of the user interface page.

13. The one or more non-transitory computer-readable media of claim 1, wherein the instruction further cause generating a plurality of atomic transactions including the first atomic transaction responsive to the first request; wherein changes are segmented into different atomic transactions based at least in part on rules registered with at least one page region of the page of the user interface.

14. The one or more non-transitory computer-readable media of claim 1, wherein the instructions further cause storing a respective link between each user interface object of a set of user interface objects on the page and one or more entity objects; wherein changes are segmented into different atomic transactions based at least in part on rules registered with at least one page region of the page of the user interface.

15. The one or more non-transitory computer-readable media of claim 1, wherein the first data object is linked to one or more database objects through a primary key.

16. The one or more non-transitory computer-readable media of claim 1, wherein the second atomic transaction is committed before the first atomic transaction.

17. The one or more non-transitory computer-readable media of claim 1, wherein the instructions further cause:
generating the first cache of transaction data for the first atomic transaction by
flagging a first set of nodes in a hierarchical representation of the page that are not on a first list of data objects associated with the change to the first data object;
removing flagged nodes in the first set of nodes that do not have any unflagged children nodes within the hierarchical data representation; and
modifying flagged parent nodes that have at least one unflagged child node to serve as a reference node in the first cache of transaction data;
generating a second cache of transaction data for the second atomic transaction by:
flagging a second set of nodes in the hierarchical representation of the page that are not on a second list of data objects associated with the change to the second data object;
removing flagged nodes from the second set of nodes that do not have any unflagged children nodes within the hierarchical data representation; and
modifying flagged parent nodes that have at least one unflagged child node to serve as a reference node in the second cache of transaction data;
wherein executing the first atomic transaction comprises initiating a first approval transaction using a first approval process definition;
wherein executing the second atomic transaction comprises initiating a second approval transaction using a second approval process definition that is different than the first approval process definition.

18. A system comprising:
one or more hardware processors;
one or more non-transitory computer-readable media storing instructions, which, when executed by one or more hardware processors, cause:
receiving, through a page of a user interface, a first request to change at least a first data object;
generating, based on the first request, a first cache of transaction data for a first atomic transaction to modify the first data object in a database, wherein generating the first cache of transaction data includes modifying a set of nodes in a hierarchical representation of the page by removing at least a first node from the hierarchical representation of the page that is not a target of the first atomic transaction, wherein removing the first node prevents at least a second data object corresponding to the first node from being locked;
before the first atomic database transaction has committed to the database:
receiving, through the page of the user interface, a second request to change at least the second data object;
generating, based on the second request, a second atomic transaction to modify the second object in the database; and
executing the second atomic transaction independently of the first atomic transaction, wherein the first atomic transaction is executed using the first cache of transaction data.

19. A method comprising:
receiving, through a page of a user interface, a first request to change at least a first data object;
generating, based on the first request, a first cache of transaction data for a first atomic transaction to modify the first data object in a database, wherein generating the first cache of transaction data includes modifying a set of nodes in a hierarchical representation of the page by removing at least a first node from the hierarchical representation of the page that is not a target of the first atomic transaction, wherein removing the first node prevents at least a second data object corresponding to the first node from being locked;
before the first atomic database transaction has committed to the database:
receiving, through the page of the user interface, a second request to change at least the second data object;
generating, based on the second request, a second atomic transaction to modify the second object in the database; and
executing the second atomic transaction independently of the first atomic transaction, wherein the first atomic transaction is executed using the first cache of transaction data.

20. The one or more non-transitory computer-readable media of claim 1, wherein modifying the set of nodes in the hierarchical representation of the page comprises removing at least one node in the hierarchical representation of the page that is not associated with the change to at least the first data object.

* * * * *

UNITED STATES PATENT AND TRADEMARK OFFICE
CERTIFICATE OF CORRECTION

| | |
|---|---|
| PATENT NO. | : 11,645,265 B2 |
| APPLICATION NO. | : 16/673510 |
| DATED | : May 9, 2023 |
| INVENTOR(S) | : Holmes et al. |

It is certified that error appears in the above-identified patent and that said Letters Patent is hereby corrected as shown below:

In the Specification

In Column 7, Line 47, delete "approval e 111" and insert -- approval --, therefor.

In Columns 19-20, Line 71 (Table 1-continued), delete "<7DATA>" and insert -- </DATA> --, therefor.

In Columns 21-22, Line 40 (Table 1-continued), delete "2000-17-31" and insert -- 2000-12-31 --, therefor.

Signed and Sealed this
Twentieth Day of February, 2024

Katherine Kelly Vidal
*Director of the United States Patent and Trademark Office*